United States Patent [19]

Arulpragasam et al.

[11] 4,392,200
[45] Jul. 5, 1983

[54] CACHED MULTIPROCESSOR SYSTEM WITH PIPELINE TIMING

[75] Inventors: Jega A. Arulpragasam, Stow, Mass.; Robert A. Giggi, Merrimack, N.H.; Richard F. Lary, Colorado Springs, Colo.; Daniel T. Sullivan, Bolton, Mass.

[73] Assignee: Digital Equipment Corporation, Maynard, Mass.

[21] Appl. No.: 239,129

[22] Filed: Feb. 27, 1981

Related U.S. Application Data

[63] Continuation-in-part of Ser. No. 116,083, Jan. 28, 1980, Pat. No. 4,345,309.

[51] Int. Cl.³ .............................................. G06F 9/10
[52] U.S. Cl. ............................... 364/200; 364/900
[58] Field of Search ..................... 364/200 MS File

[56] References Cited

U.S. PATENT DOCUMENTS 4,045,781  8/1977  Levy et al. ...................... 364/200
4,225,922  9/1980  Porter ............................ 364/200

*Primary Examiner*—Gareth D. Shaw
*Assistant Examiner*—Terence Flyntz
*Attorney, Agent, or Firm*—Cesari and McKenna

[57] ABSTRACT

A multiprocessor data processing system, the processors (30) and input/output devices (32) of which share a common control unit (CCU 10) that includes a write-through cache memory (20), a memory management circuit (22) and an address translation circuit (24). The data processing system further includes random access memory (28) and a secondary storage facility (40, 42, 68, 70). The processors (30) and the input/output devices (32) use the memory management circuit (22), the address translation circuit (24) and the cache memory (20) in an ordered pipelined sequence. When a read command "misses" the cache memory (20), the CCU accesses the memory modules (28) for allocating its cache memory (20) and for returning read data to the processors (30) or input/output devices (32). The CCU also includes a duplicate tag store (67) that maintains a copy of the cache memory address tag store (20A) thereby to enable the CCU to update its cache memory when data is written into a memory location that is to be maintained in the cache memory.

13 Claims, 24 Drawing Figures

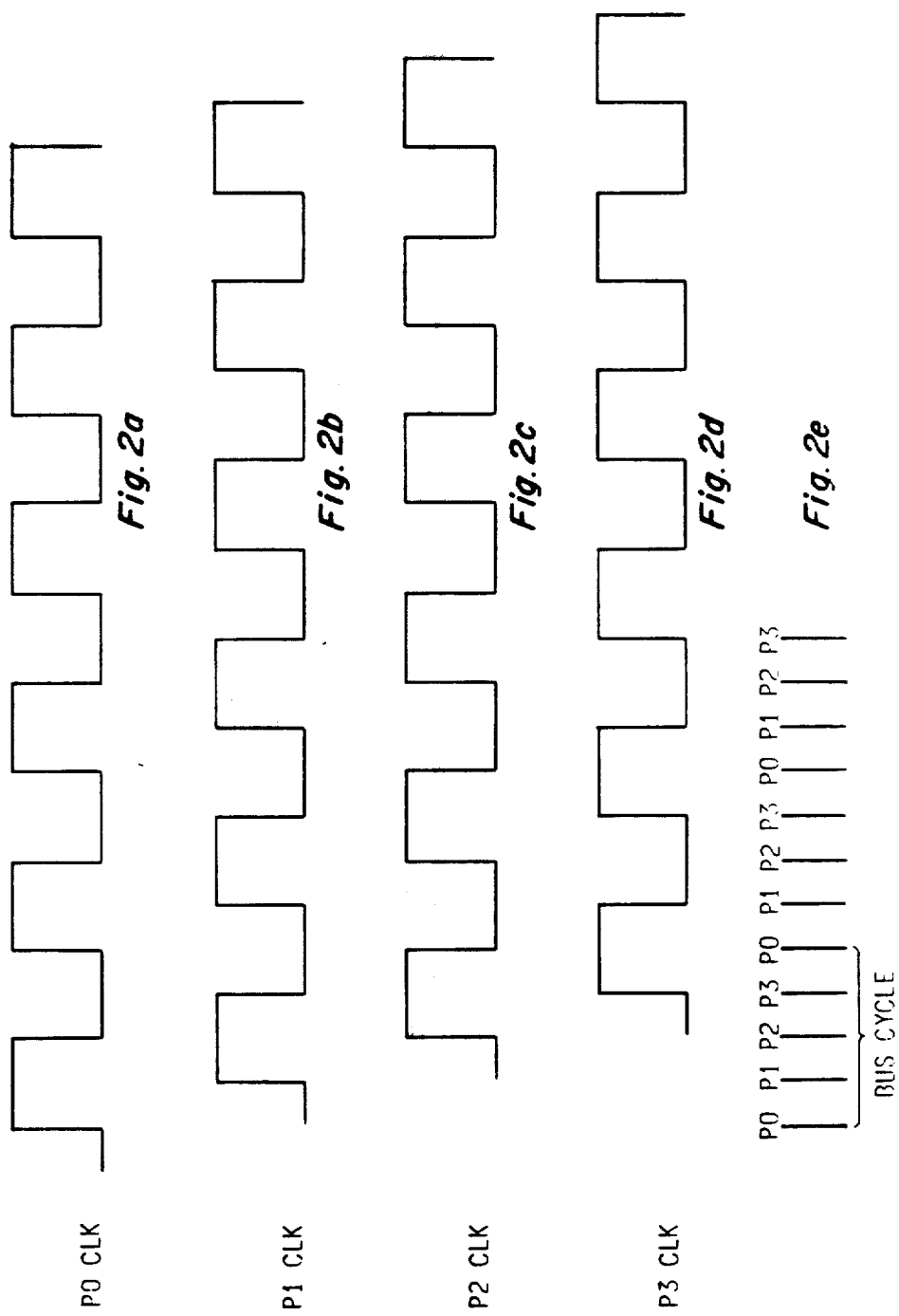

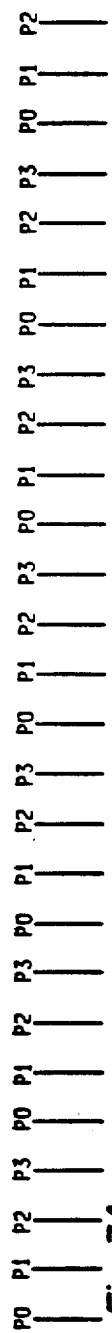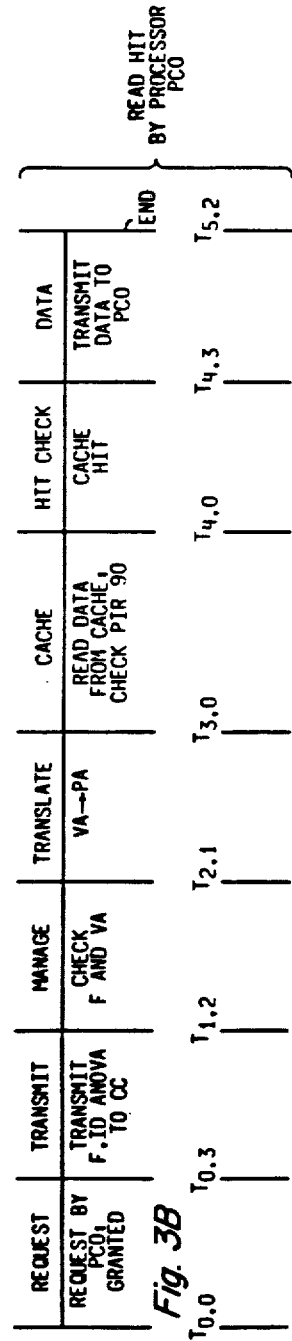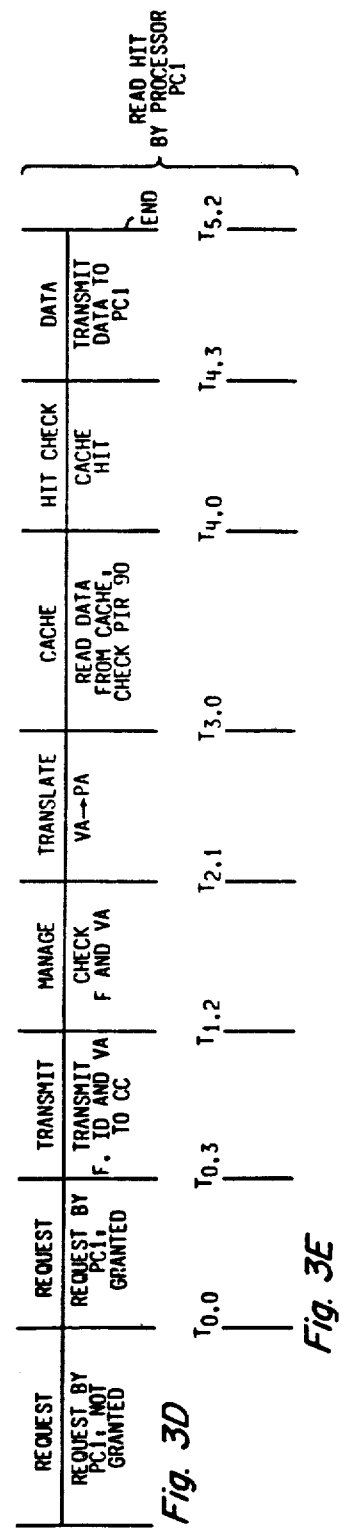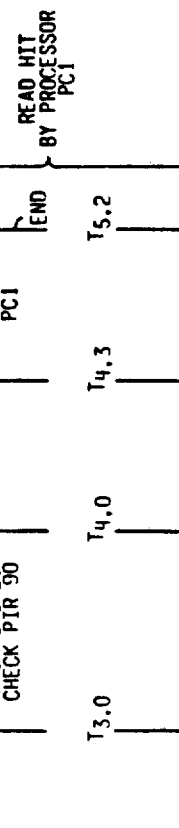
Fig. 3A
Fig. 3B
Fig. 3C
Fig. 3D
Fig. 3E

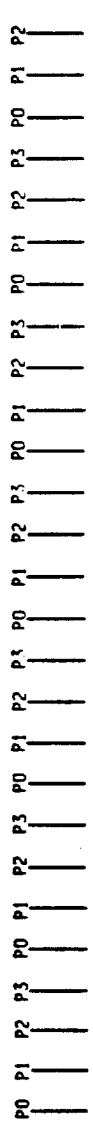
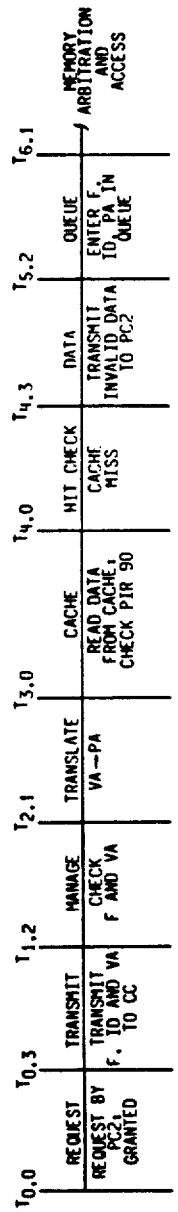
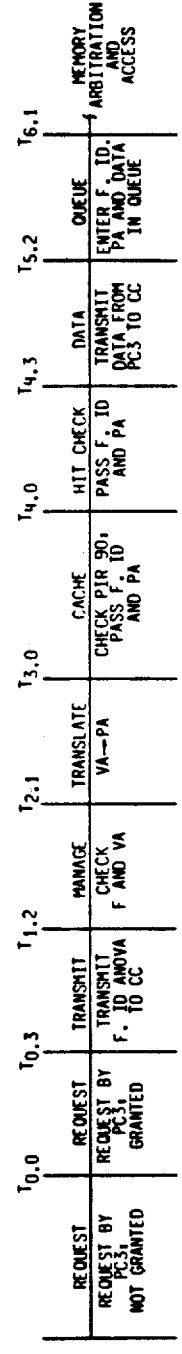
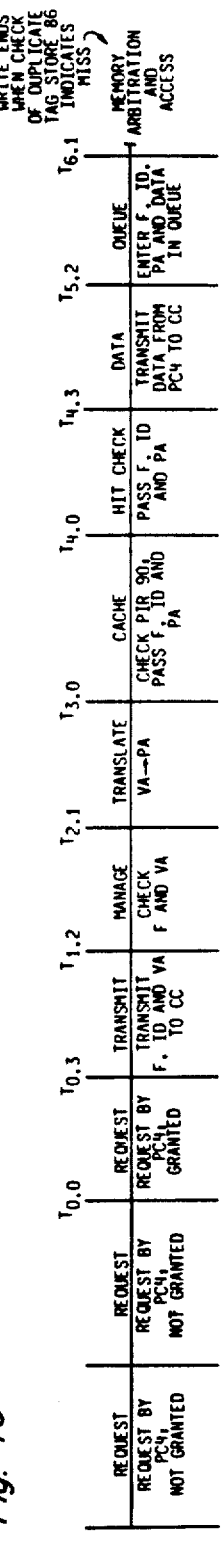
Fig. 4A
Fig. 4B
Fig. 4C
Fig. 4D

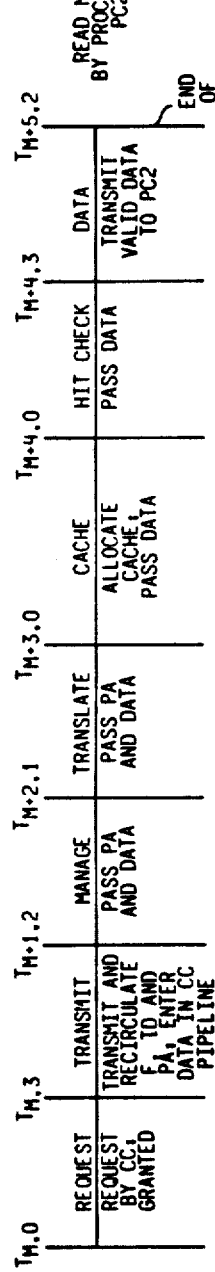
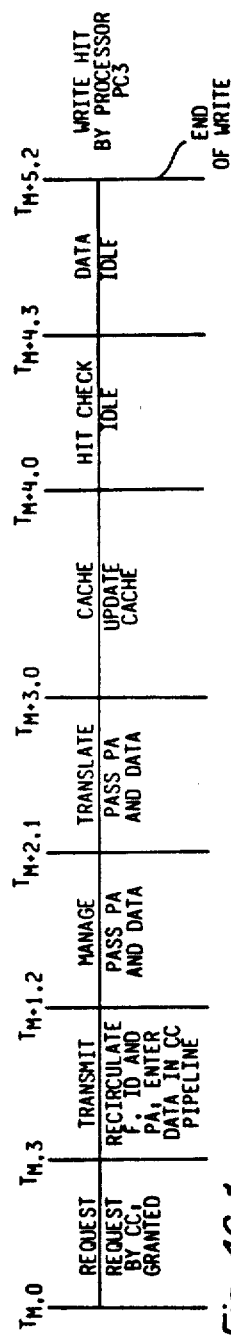
Fig. 4A-1
Fig. 4B-1
Fig. 4C-1
Fig. 4D-1

TABLE I

| PIPELINE PASS | P-BUS FUNCTION | PHYSICAL ADDRESS RANGE | F3-F0 BITS | CCF2-CCF0 BITS | CCU FUNCTION |
|---|---|---|---|---|---|
| 1ST | READ | UNIBUS OR MEMORY | 0010 | 000 | GET DATA FROM CACHE, MEM OR UNIBUS |
| 2ND | READ | INTERNAL REGISTER | 0010 | 001 | GET REG. DATA |
| 2ND | READ | CACHE | 0010 | 010 | GET CACHE DATA |
| 2ND | READ | MEMORY | 0010 | 011 | WRITE DUP TAG MEM., ALLOCATE CACHE, RETURN DATA |
| 2ND | READ | UNIBUS | 0010 | 100 | RETURN DATA |
| 1ST | WRITE | UNIBUS OR MEMORY | 0100 | 000 | WRITE PIR, SET WIP BIT, WRITE MEM OR UNIBUS |
| 2ND | WRITE | INTERNAL REGISTER | 0100 | 001 | WRITE INT.REG., CLEAR PIR & WIP BITS, NOTIFY PN. |
| 2ND | WRITE | INTERNAL REGISTER | 0100 | 010 | WRITE CACHE REG. CLEAR PIR & WIP BITS, NOTIFY PN. |
| 2ND | WRITE | MEMORY | 0100 | 011 | CLEAR PIR, UPDATE CACHE IF DUP. TAG. HIT, NOTIFY PN. |
| 2ND | WRITE | UNIBUS | 0100 | 100 | CLEAR PIR & WIP BITS, NOTIFY PN. |

Fig. 5

Common Control Unit 10

Internal Memory Arbitration
And Return Circuit 168

CACHED MULTIPROCESSOR SYSTEM WITH PIPELINE TIMING

CROSS REFERENCE TO RELATED U.S. PATENT APPLICATIONS AND PATENTS

This is a continuation-in-part of U.S. patent application Ser. No. 116,083, filed Jan. 28, 1980, now U.S. Pat. No. 4,345,309.

References are made in the Description of an Illustrative Embodiment to the following patents and patent applications which are assigned to the same assignee as the following invention and incorporated herein by reference.

U.S. Pat. No. 3,815,099 issued June 4, 1974 for DATA PROCESSING SYSTEM,

U.S. Pat. No. 3,999,163 issued Dec. 21, 1976 for SECONDARY STORAGE FACILITY FOR DATA PROCESSING SYSTEMS, U.S. Pat. No. 4,045,781 issued Aug. 30, 1977 for MEMORY MODULE WITH SELECTABLE BYTE ADDRESSING FOR DIGITAL DATA PROCESSING SYSTEM, U.S. Pat. No. 4,229,791 issued Oct. 21, 1980 for DISTRIBUTED ARBITRATION CIRCUITRY FOR DATA PROCESSING SYSTEM.

U.S. Pat. No. 3,614,741 issued Oct. 19, 1971 for DATA PROCESSING SYSTEM.

U.S. Pat. No. 3,893,084 issued July 1, 1975 for MEMORY ACCESS CONTROL SYSTEM.

U.S. Pat. No. 3,854,126 issued Dec. 10, 1974 for CIRCUIT FOR CONVERTING VIRTUAL ADDRESSES INTO PHYSICAL ADDRESSES.

U.S. Pat. No. 3,710,324 issued Jan. 9, 1973 for DATA PROCESSING SYSTEM.

U.S. Pat. No. 4,055,851 issued Oct. 25, 1977 for MEMORY MODULE WITH MEANS FOR GENERATING CONTROL SIGNAL.

BACKGROUND OF THE INVENTION

This invention relates to a digital data processing system, and more specifically, to a multiprocessor system comprised of a plurality of digital data processors sharing common control circuitry, memory and peripherals.

A number of digital data processing systems have been built heretofore based on multiple processors. These systems, referred to as multiprocessor systems, have had many diverse constructions. They have ranged from independent processors with no interconnection, through tightly coupled processor networks that communicate with each other by passing messages, to multiprocessors that share common control circuitry, memory and peripherals. An excellent discussion of multiprocessor systems and of the trade-offs involved in system designs depending upon the degree of coupling and sharing involved in the systems is presented in Chapter 16 of the book entitled *Computer Engineering*, by C. Gordon Bell et al, Digital Press (1978).

Until recently, use of multiprocessor systems have been restricted to highly specialized applications, such as those requiring high availability, or high reliability and performance beyond that capable with a single processor with a given technology. One reason for this has been the widespread acceptance of the philosophy that a better higher performance single processor system can always be built. High performance in single processor systems, however, is generally achieved only at the expense of considerable additional design and engineering development which often restricts availability and involves trade-offs in system reliability and flexibility. Further, for the end user desiring higher performance, the substitution of new single processor system for an existing system can involve problems of system adaptation and training.

The advent of low-cost microprocessors with substantial functionability, such as those of the PDP-11 data processing family manufactured by the assignee hereof, has created new possibilities for multiprocessor systems. Because of the high availability and low cost per compute cycle of such microprocessors, multiprocessor systems comprised thereof have the potential of providing computational capabilities that span ranges typically covered by many conventional single processor systems at comparable costs. For the end user, they offer the advantage of enabling modular incremental growth over limited and well-defined performance ranges with minimum training and other field service costs.

SUMMARY

It is, therefore, an object of this invention to provide a new and improved digital data processing system based on the use of multiple processors.

Another object of the invention is to provide a multiprocessor system that takes advantage of proven technologies of memory management and input/output control.

Still another object of the invention is to provide a multiprocessor system that exhibits a high degree of multiprocessing efficiency while maintaining a compatibility with existing processor protocols.

Another objective of this invention is to provide a multiprocessing system that can be constructed of a varied number of modular components including processor modules, memory modules, mass storage devices, and input/output devices which together intercommunicate through and share a common control unit.

A more specific objective of this invention is to provide such a modular multiprocessing system, the processors of which share a common cache memory that maintains fresh data with respect to each processor without undue degradation of overall system performance.

A more general objective of this invention is to provide such a modular multiprocessing system that can be economically assembled in one configuration, and subsequently expanded into a larger configuration as the demand for processing and data storage capacity increases without the necessity of replacing or modifying existing system components.

A further objective of this invention is to provide such a modular multiprocessing system wherein the common control unit is compatible with various synchronous and asynchronous protocols, address translating circuits, and memory management routines desired in multiprocessing systems having independent operating characteristics.

In accordance with these and other objectives of this invention, a multiprocessing system comprises a common control unit including a memory management circuit, an address translation circuit, and a cache memory which are shared in an ordered pipelined sequence by at least one processor, at least one mass storage controller including at least one data storage device, at least one memory module, and at least one input/output device (e.g., an I/O terminal). The processors connect to the common control unit via a non-interlocked synchronous backplane processor bus. The processor bus comprises a set of address and control conductors for transferring with the common control unit device identification signals, memory address signals and function code signals; and a set of data and control conductors for carrying processed, storage, and memory data together with other control signals that are associated with and that lag the foregoing identification, address, and function code signals. The input/output devices connect to the common control unit via an asynchronous input/output bus whose signals are also transferred to the common control unit via the processor bus. The memory modules also connect to the common control unit via an asynchronous memory bus. The mass storage controllers connect to the common control unit via a synchronous mass storage bus. The memory bus and the mass storage bus connect to a memory interface circuit in the common control unit for accessing the main random access memory. The processors and input/output devices, when necessary, also access main memory through the memory interface circuit.

Thus, commands can be initiated on the processor bus, mass storage bus, or the input/output bus thereby to efficiently transfer information with any responding device connected to the processor bus, memory bus, mass storage bus, or the input/output bus, as appropriate. As some transactions require two accesses to the resource units of the common control unit in order to retrieve memory data that is not resident in the cache memory, or to write data into the write-through cache memory, the common control includes control means so that it may access its own elements to update or allocate its cache memory and/or return memory data to the commanding device.

The preferred structure of the common control unit comprises a separate control information path and a separate storage data path for respectively transferring among the devices of the multiprocessing system, device identification, memory address signals, and function code signals, in a first phase; and associated processed data, storage data, or memory data together with associated control signals in a second phase that lags the first phase.

In the control information path of the common control unit, control information is transferred through a multi-stage register, the first of which receives device identification signals, function code signals, and virtual address signals. The control information path also includes, at one stage, a memory management circuit that restricts the type of operations that can be performed with certain locations in the memory modules; at a subsequent stage, an address translation circuit that converts virtual addresses generated by a commanding device into a physical address in a responding device; and at a yet subsequent stage, a cache compare circuit controls read, update, and allocate operations in a cache memory.

The data path of the common control unit also includes a corresponding multi-stage register arrangement. A first-stage register receives data from a commanding device over the processor bus or from the common control unit itself in order to update or allocate its cache memory. This data lags its associated control information signals by a predetermined number of register shift cycles, which number depends upon the number of the pipeline sources. A subsequent stage of the register receives data to be returned to a requesting device directly from an internal memory return queue, rather than being sequenced through the pipeline resources. This data is inserted in the data path at a time slot of another group of control information signals that lack associated data signals thereby to utilize the otherwise vacant data slot. Thus, separation of the processor bus into a control information path and a data path improves overall efficiency of the data processing system.

Another aspect of the invention includes a Processor Index RAM and a Write-in-Progress flag. Because certain transactions initiated by a commanding device require a second pass through the resources of the common control unit to update the cache memory on a "write hit" or allocate the cache memory on a "read miss," and because another commanding device may alter the contents of cache memory before a second pass completes the transaction, the cache memory further includes a Processor Index Random-Access-Memory (PIR) having an index location associated with each processor for storing an address tag of a location being written and an associated write-in-progress (WIP) flag, which when set, inhibits other commanding devices from reading that location in the cache memory. When the write is completed on the second pass through the common control, the WIP flag is cleared.

Since the PIR contains only one address tag for each commanding device, and because a commanding device can subsequently issue another write command before completing its first write command, the multiprocessing system includes, preferably in the commanding device, a WIP flag control bit that is used for inhibiting a commanding device from issuing the subsequent write command while its first write command is in progress.

Accordingly, the common control unit can accommodate a plurality of identical processors, memory modules, mass storage devices, and input/output devices and thereby provide an economical expandable modular multiprocessing system employing a write-through cache memory that maintains fresh memory data.

The foregoing describes a preferred form of the invention. The scope of the invention, however, is pointed out with particularity in the appended claims. The above and further objects and advantages of this invention may be better understood by referring to the following description taken in conjunction with the accompanying drawings.

BRIEF DESCRIPTION OF THE DRAWINGS

FIGS. 2A through 2E depict various clocking signals that synchronize transfers of information between the elements shown in FIG. 1;

FIGS. 3A through 3E depict the timing intervals for the elements shown in FIG. 1 when a processor performs a read operation to a memory location contained in the cache of FIG. 1;

FIGS. 4A through 4D depict the timing intervals for the elements shown in FIG. 1 when a processor performs a transaction requiring two accesses to the cache of FIG. 1;

FIG. 5 is a table listing internal operations performed in the common control unit in response to various conditions occurring therein;

DESCRIPTION OF ILLUSTRATIVE EMBODIMENT

A. General Description of Multiprocessing System

In the following description, reference is made to certain terms which may have varied meanings. However, to facilitate understanding of this invention, we make the following definitions.

By using the expression "information," we mean to include device identification signals, memory address signals, signals that control the operation of a device (e.g., control and timing signals), and data signals from memory, storage, or processing devices. Alternatively, "information" broadly includes address, control, and data signals. The expression "device" means any component of a data processing system. The expression "memory data" refers to information associated with a random access memory module. The expression "storage data" means information associated with a mass storage device, such as a disk file drum unit, or magnetic tape unit. The expression "cache data" means information associated with a cache memory. Broadly speaking, the expression "data" means memory data, storage data, register data, or cache data. The expression "storage information" includes data and its concommitant control signals which are routed to/from a data storage device. The expression "identification signal" or "ID signals" means signals that identify a device in a data processing system. The expression "address signal" or "memory address signal" means signals that identify an addressable location in a data storage device. The expression "function code" or "control bits" means signals that specify how a device is to function or operate. The expression "control information" includes address, control and data signals which together determine how a device will function or operate within a given set of operations. The expressions "bus" means a plurality of parallel conductors to which several devices may connect in parallel for the transfer of information. The expression "bus connection" means the electrical connection between a device and a bus. The expression "connection" means a direct interconnection between two devices by way of a signal conductor or plural conductors. A "commanding" device is a device which issues a command. A "responding" device is a device which responds to a commanding device. A "transaction" means all the operations necessary to perform a command initiated by a commanding device. In this specification, it means the performance of all steps in an ordered pipeline sequence of events that are necessary to complete the command.

Figure 1:
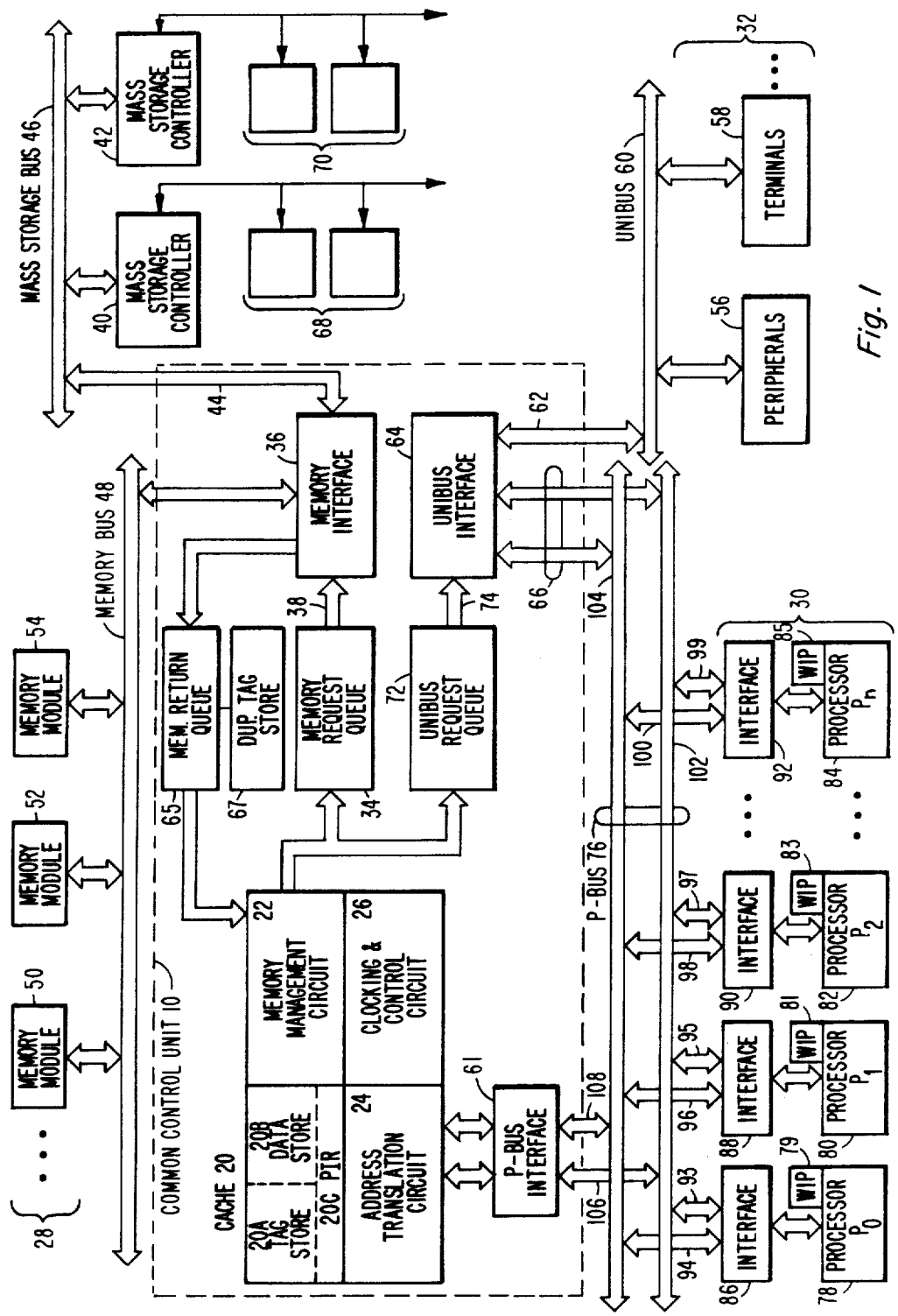
FIG. 1 is a block diagram of a multiprocessing system embodied in accordance with this invention.

With the foregoing definitions at hand, we describe a multiprocessing system constructed in accordance with this invention. Such a system is shown in FIG. 1. All devices thereof intercommunicate through a common control unit (CCU) 10. The CCU 10 includes what are termed "shared pipeline resources" including a cache memory 20, a memory management circuit 22, an address translation circuit 24, and a clocking and control circuit 26. Other "shared pipeline resources" include input registers for receiving sets of command signals and output registers for receiving data signals associated with the sets of command signals. The cache memory 20 is used for storing copies of information contained in random access memory modules 28 so that data can be quickly accessed by any one of the processors 30 ($P_1, P_2, \ldots P_n$) which together perform their processing cycles faster than the rate at which memory data can be retrieved from the memory modules 28. In this system, the memory access time for retrieving data might, for example, be 500 nanoseconds while the rate with which the CCU 10 can make a memory reference to the cache memory 20 is 133 nanoseconds. A cache memory circuit 20 that may be used with this invention is described in incorporated U.S. Pat. No. 4,055,851. The memory management circuit 22 in the CCU 10 permits appropriate accesses to certain read-only and write-only locations in the random access memory modules 28 according to preestablished rules. The memory management circuit 22 also provides a relocation constant that is used by the address translation circuit 24. A memory management circuit 22 which could be used in this invention is that described in incorporated U.S. Pat. No. 3,893,084 issued July 1, 1975. The address translation circuit 24 is used for converting virtual addresses to physical addresses. Virtual addresses are memory addresses generated by a commanding device that do not define a physical address which uniquely defines a specific address location in a responder device. Physical addresses define unique addresses. The translation circuit 24 establishes a physical address by using an arithmetic unit to add the relocation constant from a register in the circuit 22 to the virtual address obtained from the commanding device. For example, the address translation circuit 24 converts 18-bit addresses generated by a processor 30 into 22 bit addresses that uniquely define a unique location in memory modules 28. Such an address translation circuit 24 that can be used with this invention is also described in incorporated U.S. Pat. No. 3,854,126 issued Dec. 10, 1974.

The common control unit 10 also includes a memory request queue 34, subsequently described, for queing requests for access to the memory modules 28. When requested data is not resident in the cache memory 20, the CCU 10 causes the memory request queue 34 to store ID signals identifying the commanding device, physical address signal identifying the physical address in memory modules 28 involved in the transfer, and function code signals (e.g. read or write command) identifying the operation that is to be performed with the memory modules 28. These requests are then transmitted to a memory interface circuit 36 via a connection 38. In the preferred embodiment, the queue 34 holds 32 sets of command information. A queue is necessary because the request demand varies during operation of the multiprocessing system. These requests may emanate from control circuits in the clocking and control circuit 26, from processors 30, I/O devices 32, or the cache memory circuit 20 and can occur randomly.

The memory interface circuit 36 also receives requests to retrieve or store storage information from the mass storage controllers 40 and 42 through a bus connection 44. The controllers 40 and 42 are connected to a 32-bit wide synchronous mass storage bus 46 which transfers both storage and control information. The mass storage bus 46 and controllers 40 and 42 are described in U.S. Pat. No. 3,999,163 and is commercially known as a MASSBUS.

A conventional arbitration circuit in the memory interface 36 determines whether requests from the memory request queue 34 or the mass storage controllers 40 or 42 will be honored. Although not shown, the memory interface circuit could also be adapted to handle requests for access directly from the UNIBUS devices 32 via UNIBUS interface circuit 64. Once arbitration is completed, both control information signals and data signals are transferred to a memory bus 48, which signals are then transferred to an appropriate one of the memory modules 50, 52, or 54. The memory bus 48 also contains other control circuits for routing control information and memory data between the memory modules 28 and the memory interface circuit 36. A more detailed description of the memory bus 48 and memory modules 28, with associated control logic, is described in incorporated U.S. Pat. No. 4,045,781.

A memory return queue 65 stores the addressed memory data together with ID signals and the physical address from whence it came. Data to be written into the memory modules 28 also is stored in the queue 65. Write data is used for a subsequent update of the cache memory 20. This information is transmitted back to the CCU 10 to be recirculated in the pipeline resources to update or allocate the cache memory 20, if necessary, and to be ultimately transferred to the commanding device that originally requested the memory data. Whether or not a cache memory update is made depends upon the result of address comparisons in the duplicate tag store 67. Its advantage and operation is subsequently described.

Transfers of control information and data also take place between I/O devices 32, such as peripheral device 56 and terminal 58 (e.g., operator console, teletypewriter or even a remote processor), via an asynchronous I/O bus 60, commercially known as a UNIBUS and described in incorporated U.S. Pat. No. 3,710,324. Commands emanating from the I/O devices 32 access the common control unit 10 through the P-Bus interface 64. These commands first enter the UNIBUS interface circuit 64 via a bus connection 62 and subsequently are transferred to the P-Bus interface circuit 61 via separate address and data bus connections 66. Thereafter, clocking and control circuit 26 controls the execution of the commands originating from the I/O devices 32 to access internal registers in the pipeline resources, the cache memory 20, the memory modules 28, or the mass storage controllers 40 and 42 or their devices 68 and 70. Commands from processors 30 directed to the I/O devices 32 on the UNIBUS, on the other hand, enter the UNIBUS request queue 72. Thereafter, these commands, as well as commands from other devices directed to UNIBUS devices, enter the UNIBUS interface circuit 64, which then relays the command to the appropriate I/O device 32 via the bus connection 62.

The processors 30 communicate with the common control unit 10 via a processor bus 76, also called a P-Bus. In the preferred embodiment, processors 30 may comprise any number of processor units 78 through 84. The processors 30 connect to the P-Bus 76 through respective interface circuits 86 through 92. These circuits include distributed arbitration networks for controlling the processors' access to the P-Bus 76. See incorporated U.S. Pat. No. 4,229,791 for a description of the arbitration network. Interface circuits 86 through 92 are coupled to the P-Bus 76 via their respective pairs of address and data bus connections 93 through 100.

The P-Bus 76 is a non-interlocked synchronous backplane bus and includes a separate "address" bus 102, and a separate "data" bus 104. Each of the buses 102 and 104 includes a number of parallel conductors. Address bus 102 includes conductors for carrying device identification information (ID) signals, function code signals (F) signals, memory address information (ADRS) signals, and other control information, such as parity checking bits and timing signals. The ID signal identifies a commanding device when directed to the CCU 10. Otherwise, the ID signal identifies the responding device. Data and control bus 104 carries data signals between the processors 30 and cache memory 20. The processors 30 may also communicate with each other via the P-Bus 76 without using the pipeline resources 20 through 26.

Likewise, the respective interface circuits 86 through 92 include a set of "address" bus connections 93, 95, 97, and 99; and a set of "data" bus connections 94, 96, 98, and 100. These bus connections 93 through 100 enable the processors 30 to communicate with the common control unit 10 via separate address bus conductors 106, on one hand, and separate data bus conductors 108, on the other hand. Each set of conductors establishes a bus connection between the P-Bus 76 and P-Bus interface 61. The separation of conductors permits the simultaneous use of bus 102 by one device, and use of bus 104 by another device. This arrangement improves overall performance of the multiprocessing system.

Operations carried out in the P-Bus and in the processes 30 are synchronized with an internal clock of the CCU 10. Specifically, an internal four-phase clock in the clocking and control circuit 26 drives the operations on the P-Bus 76 and processors 30.

In the specific embodiment implemented by this invention, the processors 78 through 84 are PDP 11 data processing systems manufactured by the assignee hereof. These systems are described in incorporated U.S. Pat. No. 3,614,741. Their description also may be obtained from the "Micro-computer Processor Handbook" (1979) published by the assignee thereof.

Because the transactions occurring in the pipeline resources are non-interlock, certain other transactions can occur in the common control unit 10 prior to the cache memory being allocated or updated with the new information. Interlocking of commands that alter the contents of cache memory 20 would degrade overall system performance. Accordingly, in another aspect of the invention, we provide a Processor Index Ram (PIR) 20C that obviates the necessity to interlock these transactions and yet maintain time-wise efficiency in a multiprocessing system. To understand the significance of the PIR 20C, we briefly explain the operation of the cache memory 20.

The cache memory circuit 20 of the common control unit 10 is a direct mapping, write-through, cache memory. That is, the random access memory modules 28 are always written before the cache 20 can be updated. Therefore, new data written in the random access memory modules 28 must be reflected in the cache memory 20, if the physical address being written corresponds with one of the addresses in tag store 20A. Otherwise, cache memory data could become stale. Since we provide a write-through feature, certain operational requirements must exist among the devices of the processing system in order for maintaining fresh data in the cache memory 20.

The cache memory 20 contains a data store 20B having a certain number of data storage locations, and an address tag store 20A having a corresponding number of address storage locations. The data store 20B contains copies of memory data located in the memory modules 28. The specific address location in memory modules 28 that are duplicated in the data store 20B is identified by the corresponding address information contained in a corresponding location in tag store 20A. Thus the cache memory 20 is said to be "associated" with the memory modules 28, and therefore, it is also referred to as an "associative" memory.

When a commanding device in the data processing system requests information from a location in the memory modules 28, the pipeline resources of the CCU 10, during a CACHE interval, check the tag store 20A to determine whether or not it must access memory 28 to retrieve the requested data. If negative, cache data is returned to the commanding device from the cache memory 20B at the end of the first pass through the pipeline resources. Thus, in this case, the commanding device, on its request for information from the memory modules 28, is said to "hit" the cache. Oppositely, the commanding device is said to "miss" is cache when the requested data is not resident therein. In this case, any cache data appearing on the data lines is invalidated at the end of the first pass through the pipeline resources. At the appropriate period, the clocking and control circuit 26 queues the request in the memory queue 34 for a subsequent request to the memory modules 28. Thus, the transaction initiated by the commanding device cannot be completed until a second pass is made through the pipeline resources. The second pass is made by the CCU 10 on behalf of the commanding device to read the data. When the requested data is retrieved, it is then returned to the commanding device by the CCU 10. Meanwhile, the commanding device awaits the requested information. On the second pass through the pipeline resources, the common control unit 10 allocates both the tag store 20A and data store 20B with the new information from the memory modules 28. It then passes the requested data to the commanding device.

To maximize use of the P-Bus 76, data that is to be returned to the requesting device is transmitted in a P-Bus time slot for which the data bus is not being used by previously issued command then being sequenced over the address bus, e.g., a previously issued READ command. Prior to placing the return data on the data bus 104, its associated ID, function code, and address signals were placed in an appropriate slot on address bus 102 thereby to inform the awaiting P-Bus device that the requested data is forthcoming.

The write-through feature requires that the system embody a write-in-progress (WIP) control bit in WIP circuits 79, 81, 83 and 85 associated with processors 78, 80, 82 and 84, respectively; and a Processor Index RAM (PIR) associated with the cache 20. These circuits inhibit a processor 30 from reading a location in memory module 28 for which it has a write in progress. Specifically, when the WIP bit is set, the CCU checks the address in the PIR. If the processor seeks to write that location in the PIR, these circuits force the processor to "miss" the cache on each subsequent read command until the WIP control bit is cleared. This control bit is cleared by the CCU 10 on its second pass through the pipeline resources to update itself in response to the previously issued "write hit" command issued by the processor. Since the PIR only contains one address storage location for each processor, each processor 30 checks its WIP control flag bit 79, 81, 83, and 85, respectively, and if set, foregoes the issuance of its subsequent write command.

Similarly, other devices, such as input/output devices 32 or mass storage controllers 40 and 42, may also affect the cache memory data by issuing of a "write hit" command. They too, although not shown, might incorporate a Device-Index-RAM (DIR) and a corresponding WIP control flag bit, which together, enable the system to maintain fresh data in the cache 20.

When a commanding device issues a write command, the common control unit 10 checks a duplicate tag store 67, subsequently described, to determine if it contains the address in memory to which the write command is directed. If affirmative, control circuit 26 updates the affected location in cache store 20B, while the corresponding tag store location remains unchanged. The update operation on this write cycle is interlocked so that no other operation can occur within the cache circuit 20 while it is being updated. Thus, the cache memory 20 is a direct mapping write-through cache memory.

In a manner subsequently described herein, clocking and central circuit 26 controls a pipelined sequence of events in the CCU 10 with order preserved for all commands entering the pipeline. In the preferred embodiment, a four-phase clocking signal, having 133 nanosecond intervals, successively activates each resource in the common control unit in an ordered sequence thereby to step each command through the stages of the CCU 10. As previously indicated, commands can be initiated by any one of the processors 30, UNIBUS devices 56 or 58, or mass storage controllers 40 or 42. The common control unit 10 also includes internal registers which can be read by a device to acquire status information. These control registers can also be written by any device or with control information generated by the CCU itself thereby to control its internal operation when it makes a second pass to update or allocate its cache memory and/or to pass the requested data to a commanding device.

(2) The P-bus

The P-bus is divided into two sections: an address and control section 102, and a data and control section 104. The address section carries virtual address signals (VA) which identify memory locations, function code signals (F) which indicate what type of transaction is being done, and identification signals (ID) which tell what devices are involved in the transaction. For example, the ID signals may tell what device initiated the transaction or to what device the transaction is directed. In those cases where the ID identifies the initiating device, the transaction is directed to the common control CC.

Access to the P-bus 76 is controlled by arbitration circuits that are distributed among the respective devices connected to the P-bus 76 (i.e., the common control CC and each of the processors PC). These arbitration circuits, which form part of the P-bus interface circuits 86, 88, 90, 92, and 61. Each such device has a distinct priority and an independent request line that forms part of the address section of the P-bus. To gain access to the P-bus, the device asserts its request line, and if no higher priority request is present when the P-bus becomes available, the device wins control of the P-bus. The common control CC is assigned the highest priority. The processors PC have distinct, lower priorities determined by their respective positions along the P-bus. Requests for access to the P-bus from the UNIBUS 60 are serviced through the request line of the common control CC.

A clocking circuit 26 in the common control CC distributes the timing signals that control transactions over the P-bus. These timing signals are distributed to each of the interface circuits 86, 88, 90, 92, and 61. As shown in FIGS. 2A through 2D, the timing signals include P0 CLK through P3 CLK quadrature-phase signals, each having a 50% duty cycle. The leading edges of the P0 CLK through P3 CLK pulses define P0 through P3 clocking times, as shown in FIG. 2E. The time interval between successive P0 clocking times defines a complete bus cycle and therefore is called a bus cycle time. In general, any device seeking access to the P-bus asserts its request line at P0 during a given bus cycle. Arbitration is performed between P0 and P3 of that same bus cycle, and if control is won, it is awarded at P3 of that cycle. Other operations follow sequentially, as described below.

In this specific embodiment, the interval between successive P0 times, and therefore, the bus cycle time, is about 133 nanoseconds.

(3) Pipeline Resources

The P-bus 76, and three parts of the common control needed by a processor Pn to read data from the cache 20, are organized in a pipeline. Further, the design of the pipeline is optimized to minimize the access time of a processor Pn doing a memory read that hits in the cache 20. The resources in the pipeline are the following:

(1) address, ID, F, and Internal Registers
(2) memory management circuit 22
(3) address translation circuit 24 in common control CC;
(4) cache 20;
(5) cache hit check circuit 38 and
(6) data and control information registers.

Anytime any device wins control of the P-bus, it is allocated all of the above pipeline resources. There is no way for any device to request only part of the resources in the pipeline. However, not all of the resources need by used by the device. Thus, one or more resources may be idle during a given transaction if those resources are not necessary for the transaction.

The resources in the pipeline are always allocated sequentially in the order listed above. In other words, a device that wins control of the P-bus uses the address section of the P-bus during a first time slot that starts immediately when the P-bus is allocated. The device then uses the memory management circuit 22 in the common control unit 10 during a second time slot that starts at the end of the first time slot, and so on until use of the data registers of the P-bus is completed. As noted, this order is selected to minimize the access time of a processor Pn doing a memory read that hits in the cache 20. Cache simulation studies indicate that read hits predominate in PDP-11 data processing systems of the type used in this specific embodiment. See the above-referenced book entitled *Computer Engineering*, by C. Gordon Bell et al, Digital Press (1978), particularly Chapter 10 thereof. The beginning and end of each resource time slot are synchronized to the clocking times P0 through P3 of FIG. 2E, as explained below.

FIG. 3 illustrates the timing for a processor Pn doing a memory read that hits in the cache 20. The clocking times P0 through P3 of FIG. 2E are repeated in FIG. 3A. Assume processor PC0, desiring to perform a memory read, asserts its request line at P0 of a given bus cycle. If the processor $P_0$ has the highest priority of those requesting the P-bus at that time, it is awarded the P-bus at P3 of the same bus cycle. The time interval between the request and the grant is labeled REQUEST in FIG. 3B.

From P3 of the same bus cycle to P2 of the next bus cycle, the processor $P_0$ uses the address section of the P-bus to transmit a function code F indicative of a memory read, its ID, and the virtual address VA of the memory location to be read to the common control CC. This time interval is labeled TRANSMIT in FIG. 3B.

From that P2 until the next P1, that is, during a MANAGE interval in FIG. 3B, the processor $P_0$ uses the memory management circuit 22 in the common control CC. During the MANAGE interval, the memory management circuit checks the function code F and the virtual address VA received from the processor PC0 to determine if the location defined by the address is one for which a read is permitted. If the location can be read, the circuit 22 also generates a relocation constant.

From that P1 until the next P0, that is, during a TRANSLATE interval in FIG. 3B, the processor P uses the address translation circuit 24 in the common control unit 10. An arithmetic unit in the circuit 24 adds the relocation constant to the virtual address VA received from the processor PC0 to generate a physical address PA.

The next interval is CACHE. During this interval, the cache 20 is read using the physical address PA. The CACHE interval extends a full bus cycle, that is, from the last P0 until the P0 that follows it, and is thus the longest time interval of all the resources in the pipeline. The CACHE interval, however, is made long enough to permit only one access to the cache 20.

The next interval is HIT CHECK. During this interval, the cache hit check circuit in the common control unit 10 is used to determine if the read hit in the cache 20. The HIT CHECK interval extends from the P0 at the end of the CACHE interval to the next P3.

The last interval in FIG. 3B is the DATA interval. During the DATA interval, which extends from the last P3 to the next P2, the data section of the P-bus is used to transmit the data read from the cache 20 back to the processor $P_0$. At the end of the DATA interval, the memory read is completed.

If the hit check circuit indicates that the memory read hit in the cache 20, the ID sent by the processor P is not needed. The processor $P_0$, which is synchronized to the P-bus timing, strobes the data section of the P-bus during the DATA interval to receive the data. The ID is needed when the memory read misses the cache 20, as explained below.

At this stage of the description, some additional timing nomenclature is useful. As noted, all transactions begin when a device asserts its request line and end when the last resource in the pipeline completes its operation. Time from the beginning of a transaction can be counted in bus cycles and clocking times. Thus, let Tm,n refer to a transaction time that occurs on the n-th clocking time after the m-th bus cycle after the beginning of a transaction. Thus, for example, the processor PC0 described above during a memory read asserts its request line at T0,0, uses the address section of the P-bus from T0,3 until T1,2, and so on until it receives the data at T5,2. The timing of the pipeline for the processor PC0 is shown in FIG. 3B in terms of transaction times $T_{m,n}$.

It is possible to allocate the resources of the pipeline for a memory read that hits in the cache 20 at P3 of each consecutive P-bus cycle. If this happens, every resource in the pipeline at a given time will be doing an operation for a different memory read. FIG. 3D shows the timing for a read hit that is initiated by a processor $P_1$ having a lower priority than the processor $P_0$ described above. FIG. 3E shows the timing for the read hit by the processor $P_1$ in terms of transaction times $T_{m,n}$.

With the pipeline resource organization described above, the data registers of the P-bus are used after the cache 20 is accessed. As a result, memory reads that hit in the cache 20 require only one pass through the pipeline to retrieve the desired data. However, memory reads that miss in the cache 20, and all memory writes, require access to the backing store memory units 28. Further, to maintain the validity of the data stored in the cache 20, memory read misses must allocate the cache 20 (i.e., change both its tag store 20A and data store 20B), while memory writes into locations contained in the cache 20 must update the cache 20 (i.e., change its data store 20B). Thus, unlike read hits, read misses and writes require a second pass through the pipeline resources. The latter transactions are explained below.

(4) Common Control Functions In Memory Request Queuing

Figure 6:
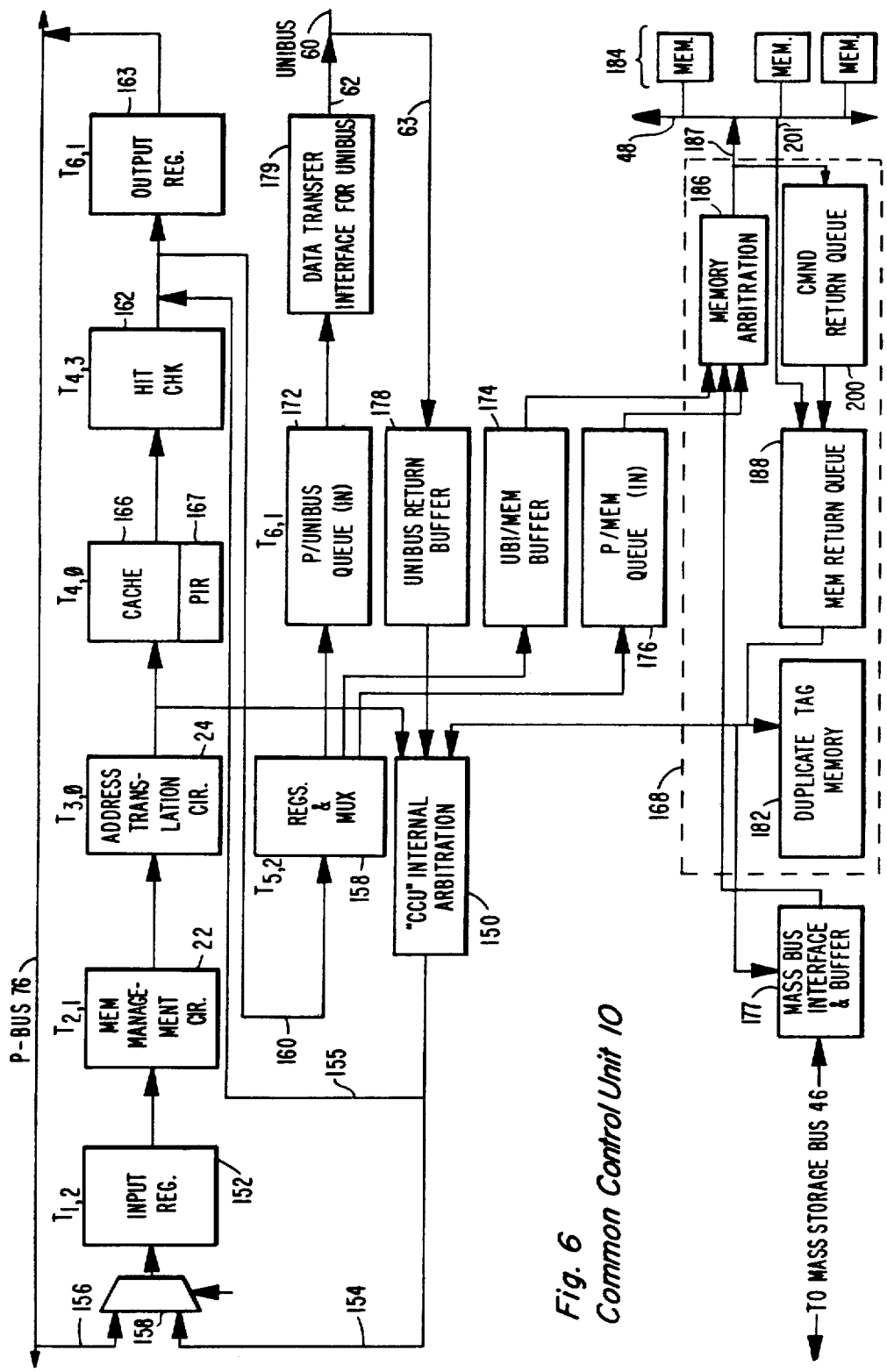
FIG. 6 depicts a more detailed diagram of the common control unit used in FIG. 1.

FIG. 6 illustrates further details of the common control CC. The operation of the common control unit 10 is best illustrated by describing how it responds to memory reads that miss in the cache 20 and to memory writes. Read misses will be discussed first.

Assume processor $P_2$ desires to read data from a memory location that is not contained in the cache 20. The processor $P_2$ will proceed synchronously through the resources of the pipeline in the same manner described above for the processor $P_0$ doing a read that hits in the cache 20. In fact, data is sent back to the processor $P_2$ through the data registers of the P-bus during the DATA interval of the pipeline even if the hit check circuit 162 determines that the read missed in the cache 20. The data returned is thus incorrect. To account for this, the hit check circuit 162, upon detecting a miss, negates a DATA VALID signal and transmits the negated DATA VALID from the register 163 signal back to the processor $P_2$ over the data section of the P-bus with the incorrect data. The negated DATA VALID signal puts the processor $P_2$ in a WAIT state until, during TRANSMIT interval of a subsequent pipeline sequence, the processor $P_2$ senses its own ID on the P-bus. The correct data for the location read by the processor $P_2$ is received four cycles later from the data section of the P-bus during the DATA interval of that subsequent pipeline sequence.

Transaction times are indicated above the components shown in FIG. 6. They indicate the time when the corresponding component completes its operation in the pipeline.

As noted, the processor $P_2$ is attempting a read from a memory location that is not contained in the cache 20. Upon detecting the miss, the hit check circuit in the cache 20 enters a function code F for a read, the ID of the processor $P_2$, and the physical address PA of the memory location to be read in the registers of multiplexer 158. The information is latched into the registers at T5,2. At T6,1, the same information is entered in the appropriate queues or buffer 172, 174, or 176. Once the information is stored in the queues or buffer, the first pass of the read miss through the pipeline resources is completed.

As noted previously, the memory bus 48 operates asynchronously with respect to the P-bus. The memory references are invoked asynchronously through a memory bus arbitration circuit 186 until the queue is empty. The memory bus arbitration circuit 76 is described in the above referenced U.S. Pat. No. 4,045,781. Order is preserved in each of the queues 172 and 176 and therefore, all memory accesses are thus treated on a first-in-first-out basis.

After a command wins control of the memory bus 48, it accesses the desired location in the backing store memory units 184. After the memory access is completed, the physical address PA and data read from the memory units 184 are passed from the memory bus 48 to a memory return queue 188. The memory return queue 188 also operates on a first-in-first-out basis. A duplicate tag store 182 is also maintained at the entry to the memory return queue 188 as a copy of the tag store 20A in the cache 20. Upon entry of the data in the memory return queue 188, a duplicate tag in the duplicate tag store 182 is written indicative of the physical address PA of the memory location just read. The purpose of the duplicate tag store 182 will be explained below.

With the data from memory stored in the memory return queue 188, the common control CC must request the pipeline in order to again access the cache 20 and to send the correct data back to the processor Pn, which initiated the read miss. The common control unit 10 thus initiates a new transaction by asserting its request line at T0,0 of a new bus cycle. As with all devices connected to the P-bus, the common control CC must arbitrate for access to the P-bus. The common control CC, however, has the highest priority of all P-bus devices. When access to the P-bus is granted at T0,3, the common control CC places a function code F indicative of a read, the physical address PA and the ID from the memory return queue 188 on the address section of the P-bus. At T4,0, the common control CC allocates the cache 20 by writing the tag store 20A of the cache 20 with the physical address PA of the memory location just read and by inserting the data in the corresponding location of the cache data store 20B. At T4,3, the data is placed on the data section of the P-bus for reception by the processor $P_1$. The read miss operation is then complete.

From a device point of view, write operations to locations in memory are simple. The device initiating such a write requests the pipeline, places virtual address information VA on the address section of the P-bus during the TRANSMIT interval, places the data to be written on the data section of the P-bus during the DATA interval, and is then done. For the common control CC, however, writes are more involved. The common control CC must update the cache 20 if the location being written is in the cache 20. Since the order of the resources in the pipeline is such that the data to be written is not available to the common control CC when the cache 20 is accessed during the first pass through the pipeline, a second pipeline pass must be initiated.

If, during the first pass through the resources of the pipeline, the common control unit 10 detects a function code F indicative of a write to memory, it places the function code F, the physical address PA of the location to be written and the data to be written in the register 158. The information is then transfered to the queue 172 or 176 or to buffer 174, depending upon the ID signals, when the first pass through the pipeline resources is completed.

After the command wins control of the memory bus 48, it does a write in the backing store memory units 184. When the memory cycle is completed, the data from memory and the physical address PA of the location just written into memory 184 are loaded into the memory return queue 188. The duplicate tag store 182 is then checked to determine if the memory location just written is one that is contained in the cache 20. If it is not, the common control CC is done processing the write. If it is, then the common control CC requests the pipeline to initiate a second pass through the resources of the pipeline. During the second pass, the data store 20B of the cache 20 is updated with the data written into memory.

As noted, the duplicate tag store 86 is maintained as a copy of the tag store 20A in the cache 20. The validity of this copy is maintained by interlocking changes in the duplicate tag 182 with changes in the cache tag store 20A. The duplicate tag store 182 prevents a particular cache location that has yet to be updated by a write that hits in the cache 20 from being updated if it has been reallocated to a different memory location between the two passes of the write through the resources of the pipeline. Such an erroneous reallocation could occur, for example, if the second pass of a read that missed the cache 20 occurred in time between the first and second pass of a write.

To illustrate, assume that the duplicate tag store 182 is eliminated, and that at a given time T0, cache location X corresponds to memory location A. Assume also that, at the time T0, the first pass of a read through the resources of the pipeline that misses the cache 20 is completed, but not the second pass of that read. At a later time T1, a write to memory location A is received by the common control CC. Because memory location A is contained in cache location X, the write would be treated like a cache hit. Assume further that at time T2, the second pass of the read that missed the cache 20 allocates cache location X to a different memory location, e.g., memory location B. At time T3, the second pass of the write being treated as a cache hit updates cache location X with the new data from memory location A. This results in erroneous data being stored in cache location X.

This problem is avoided according to the invention through the implementation of the duplicate tag store 182 at the entry of the memory return queue 188. It was recognized that only entries from the memory return queue 188 can change a cache tag. By placing the duplicate tag store 182 at the entry to the memory return queue 188 and by preserving order through the queue 188, it can be assured that the tag found in the duplicate tag store 182 is identical to that actually in the cache 20 at the time the particular entry reached the cache 20. If a particular cache location X happens to be reallocated to a new memory location before the write completes its second pass through the pipeline, a check of the duplicate tag store 182 reveals this. In that event, the write is treated as a cache miss even though the desired location may have been in the cache 20 during the first pass through the resources of the pipeline. As a result, the cache 20 is not erroneously updated.

The duplicate tag store 182 serves another purpose. As noted, the contents of the backing store memory units 184 can be changed by the mass storage controllers 40 and 42. When a memory location that is in the cache 20 is changed by an I/O transaction from the units 40 or 42, this change must be reflected in the contents of the cache 20. It is inefficient, however, to go through the cache 20 continually whenever the contents of the memory units 184 are changed by the units 40 or 42.

In this system, all accesses to the backing store memory units 28, including those from the secondary storage facilities 40 or 42, are serviced through the memory arbitration circuit 186 and memory return queue 188 with order preserved. This eliminates conflicts between transactions initiated by the units 40 and 42 and those initiated by P-bus devices which involve the same location in the memory units 184. Further, transaction from the units 40 or 42, like those from P-bus devices, check the duplicate tag store 182 prior to initiating a cache update. If the duplicate tag store 182 indicates that the location written to by the units 40 or 42 is in the cache 20, the cache 20 is updated; otherwise, it is not. This allows the cache 20 to be used only when an actual update is necessary thereby eliminating continual use of the cache 20 for every memory location written by the units 40 or 42. In this manner, the cache 20 can be utilized for P-bus activity without sharing the bandwidth of the cache 20 with updates from the units 40 and 42.

As noted, writes that hit a given location in the cache 20 require a second pass through the resources of the pipeline to update the cache 20. It is possible that a processor PC that is in the process of updating the location will attempt to read the same location before the update is completed. This would result in the return of unmodified, invalid data.

This problem could be avoided by invalidating the location in the cache 20 that is being written on the first pass of the write through the resources of the pipeline. However, this would force the processor performing the write to be stalled for the entire duration of the write. It could also result in the invalidation of a cache location being used by another P-bus device. Both would degrade overall system performance.

In accordance with the invention, a Processor Indexed Ram (PIR) 167 is implemented as part of the cache 20. The PIR 167 is used in lieu of any cache invalidation scheme. The PIR 167 includes one location for each processor 30 in the system 10. The PIR 90 is indexed by the ID of the processors PC and is one bit wider than the 12-bit index of the cache 20. The additional bit in the PIR index is used as an indicator of when a write operation is in progress.

On the first pass of a write operation through the resources of the pipeline, the location of the PIR 167 corresponding to the processor Pn performing the write is written with the tag of the memory location to be written. At the same time, the additional bit in that location of the PIR 167 is set. Whenever a processor Pn attempts to read a location in the cache 20, it accesses its corresponding location in the PIR 167 during the CACHE time interval and checks the tag and the additional bit stored therein to determine if the location it is trying to read is one for which it has a write in progress. If it is, the read operation is treated as a read miss even if the location to be read is in the cache 20. The read is thus forced to enter the memory queue 172 behind the write. If it is not, the read operation proceeds as it would normally, i.e., as a read hit if the location is in the cache 20, or as a read miss if the location is not in the cache 20. When the write passes through the resources of the pipeline the second time, it clears the additional bit in the PIR 167 during the CACHE interval to signify that the write to the location has been completed.

FIG. 4B illustrates the timing for a read operation that is initiated by the processor $P_2$ and that misses the cache 20. FIG. 4C illustrates the timing for a write operation that is initiated by a processor $P_3$ that hits the cache 20. Processor $P_3$ has a lower priority than processor $P_2$. FIG. 4D illustrates the timing for a write operation that is initiated by a processor $P_4$ that misses the cache 20. Processor $P_4$ has a lower priority than processor $P_2$ and processor $P_3$. The clocking times P0 through P3 are shown in FIG. 4A.

In this specific embodiment, the PIR 90 includes only one location for each processor PC in the system 10. Thus, the PIR 167 can account for only a single write in progress for each processor Pn. It is possible, however, for any given processor Pn to have more than one write operation in progress at a given time. If that happens, the PIR 90 prevents only the first of the locations being written to from being read. The succeeding locations being written to can be read by the processor PC, resulting in the return of invalid data.

In this specific embodiment, this problem is avoided through the implementation of a WRITE IN PROGRESS (WIP) flag in the hardware of the processors 30. The WIP flag, in effect, prevents any single processor Pn from having more than one write outstanding at any given time. When a processor PC desires to initiate a write operation, it checks its WIP flag before it requests the P-bus. If the WIP flag is set, then the processor PC continues to check the WIP flag until the WIP flag is cleared. When the WIP flag is cleared, the processor Pn requests the P-bus, transmits its ID, a write function code F and the VA of the location to be written over the address section of the P-bus, and then sets its WIP flag. When the processor Pn thereafter sees the common control unit 10 access the pipeline resources to update the cache and to clear the additional bit in the PIR 167, the processor Pn also clears its WIP flag. With this approach, all write operations must be forced to make a second pass through the pipeline resources, even if a check of the duplicate tag store 182 indicates that the location being written to is not contained in the cache 20, so as to clear the additional bit in the PIR 167 and the WIP flag in the processor Pn.

As an alternative to this approach, the PIR 167 could be implemented so as to include more than one location for each processor Pn in the system 10. The PIR 167 would then be capable of accounting for the case where a single processor PC has more than one write operation outstanding at any given time.

In a typical operation, input/output devices 32 (which might also include a remote processor) and the processors 30 initiate transactions with the pipeline resources by sending ID, function code, and virtual address signals to the highspeed P-Bus interface circuitry 61. The memory modules 28 are only accessed by the CCU 10 when these transactions "miss" the cache when performing a read command, or when performing a write command. As previously explained, some of these transactions occur synchronously, others occur asynchronously, and some may even directly access the memory modules 28 or internal command/status registers of the CCU 10 when the command so authorizes.

The mass storage controllers 40 and 42, on the other hand, always directly access the memory modules 28 via the memory interface 36 and therefore do not use the resources of the pipeline. However, the common control unit 10 does monitor write commands issued by the mass storage controllers 40 and 42, and if a location in the cache memory 20 is affected, an update of the cache is made by the CCU 10. Thus, it is apparent that, apart from synchronous accesses to the cache 20, requests for access to the memory modules 28 occur at various random time periods. To optimumly handle these requests, we show in FIGS. 6 and 7 a queuing and memory arbitration arrangment for receiving the requests for access to the memory modules 28 thereby to provide efficient data throughput for our multiprocessing system. All queues operate on a first-in-first-out (FIFO) basis.

In FIG. 6, physical addresses, function codes, and ID signals, and data signals (if a write request) enter the first stage register 152 from the P-Bus 76 or from an internal arbitrator 150. These signals enter from a bus connection 156 on a first pass through the pipeline, or enter from bus connection 154 on a second pass through the pipeline as a result of an internal request by the CCU 10 to update or allocate its cache memory, to pass data to a UNIBUS device, or to recirculate information signals, as necessary. Assuming that the request is generated internally, a multiplexer 158 selects the inputs to the register 152 according to the function code signals and the internally generated CCF control bits CCF2–CCF0 generaged by a CCF generator, subsequently described. These control bits are altered from all zeroes on a first pass through the pipeline, as depicted in FIG. 5, in response to function code signals, ID signals, and the hit check circuit 162. The CCU 10 includes control circuits responsive to these controls bits to alter the internal operation of the CCU 10 on its second pass through the pipeline. The internal arbitration network 150 determines whether the CCU 10 gains access to its resources to update or allocate its cache 166, a UNIBUS device gains access to perform a transaction, or whether the memory arrangement 168 gains access to return requested data. Mass bus devices do not compete for use of the resources.

To further illustrate, assume that a read "miss" occurred on a first pass through the pipeline. This could occur when the requested data is not in the cache 20 or when the request is made to a location for which there is a write in progress. No data is returned over the P-Bus 76. Instead, at $T_{5,2}$ a multiplexer 170 sends the appropriate function code, physical address, and ID signals to a processor/UNIBUS queue 172, a UNIBUS/MEMORY buffer 174, or to a processor/memory queue 176. Likewise, on a write, the multiplexer 170 queues the same signals in the appropriate queue 170 or 172 or buffer 174. It also includes control circuitry to select the data signals associated with the function code, physical address and ID signals. The data signals, due to the number of pipeline resources, follow the address signals by four P-Bus cycles.

The processor/UNIBUS queue 172 passes its command to a UNIBUS interface circuit 178 which handles the command according to the asynchronous UNIBUS protocol mentioned in U.S. Pat. No. 3,710,324. In the preferred embodiment, queue 172 accommodates up to 16 sets of data, physical address, function code, and ID signals. It is loaded at the T time period as previously indicated. When a UNIBUS device responds to a processor/UNIBUS command, it places its data, function code, and ID signals in a UNIBUS return buffer 178. When the CCU arbitration circuit 150 accepts information from the UNIBUS return buffer 178, the CCF generator sends the appropriate control information to the processor/UNIBUS queue 172 thereby to permit another set of command information to enter the UNIBUS interface circuit 178. These procedures enable the CCU 10 to be compatible with the UNIBUS protocol.

Likewise, the UNIBUS/memory buffer 174 stores a single set of data, address, and control signals that emanate from a UNIBUS device. A command from a UNIBUS device enters the UNIBUS return buffer 178, and once it successfully gains access to the pipeline resources, it gets read data from the cache 166 via the processor/UNIBUS queue 172 if the data is resident in the cache 166. Otherwise, it places its read or write command information in the UNIBUS/memory buffer 174. If the UNIBUS command resulted in a "read miss," the CCU returns the read data to the processor-/UNIBUS queue 172 on a subsequent pass through the pipeline. If the UNIBUS command resulted in a write "hit," the CCU notes that transaction and updates its cache 166 accordingly. The CCU generator notes the status of the transaction as they are stepped through the pipeline stages thereby to generate the appropriate control bits CCF2–CCF0 for controlling the internal operation of the CCU 10 at each stage thereof.

A processor/memory queue 176 receives commands from the processors 30 that are directed to the memory modules 184. These commands include read, write, write/modify, or reads and writes to internal registers resident in the memory modules or the CCU 10. Again, assuming that a "read miss" or write occurred, all command information is queued in the queue 176 at $T_{5,2}$. The commands are subsequently selected for execution by the memory arbitration circuit 186. When executed, the write data (to memory) or read data (from memory) is returned via a memory return queue 188, together with their associated function code and ID signals. Eventually, the command returned from the memory return queue 188 gains access to the pipeline resources through the internal arbitration network 150. Thereafter, the appropriate second-pass CCU functions specified in FIG. 5 are performed in the common control unit.

Commands from devices on the mass storage bus 46, on the other hand, enter the memory arbitration circuit 176 from a buffer in the interface circuit 177. The only occasion during which a memory access by a mass storage device requires the use of the pipeline resources is when a mass storage device performs a write to the memory 184 at a location that is maintained in the cache memory 166. This determination is made with information from a duplicate tag store 182. Since the duplicate tag memory 182 is not part of the pipeline resources, only write "hits" need access the pipeline. This arrangement improves the overall performance of the multiprocessing system.

As mentioned, a CCU generator produces control bits CCF2–CCF0 that control the arbitrator 150 to give itself the highest priority when it needs to update or allocate its cache memory 166. FIG. 5 shows the control bits CCF2–CCF0 generated by the CCF generator 160 during a first pass through the pipeline resources for use by the CCU during its second pass through the pipeline resources. These control bits, together with the ID and function code signals, are supplied to a decoder in the CCU generator to produce the appropriate control signals at the appropriate time periods thereby to control the multiplexer, gates, latches and registers within the CCU 10 according to the above described algorithm. A conventional read-only-memory (ROM) might constitute a decoder 180. Specifically, the ROM might, for example, be recorded with information so that the contents of the memory address identified by the ID and function code signals represents the CCF bits stored thereat. These CCF bits are then recirculated in the pipeline thereby to control its action during the second pass.

Some specific actions performed by the CCU in its preferred embodiment during the second pass include: selecting inputs to the register 152 by controlling multiplexer 158; activating queues 172, 174, or 176 to queue a request; updating or allocating the cache 166; updating the PIR; and updating the duplicate tag store 182. Other operations also may be performed. The specific gating and control circuitry resides in the skill of a person ordinarily skilled in the art, and therefore are not herein shown in detail.

All references to memory 184 from the processors 30, UNIBUS devices 32, or mass bus devices 68 and 70 enter the memory arbitration circuit 186. The memory arbitration circuit 186 decides which of the buffer 174, interface 177, or queue 176 will gain access to the memory modules 184 to perform, for example, a memory read or write command. Read data returned from the memory module 184 is temporarily stored in a memory return queue 188 prior to being returned to the common control unit 10. Since the common control unit 10 employs a write-through cache memory 20, data that is written into the memory module 184 is also temporarily stored in memory return queue 188 for later use by the common control unit 10 to update its cache memory 20. Whether or not an update operation is performed depends upon whether a "write hit" occurs in the duplicate tag store 182. It was previously mentioned that the duplicate tage store 182 keeps track of all allocations of the cache memory 20 so as to maintain a current list of address tags corresponding to the memory data resident therein. This feature permits the common control unit 10 to update its cache memory 20 on a single pass through the pipeline resources. Two passes would otherwise be required because the hit check circuit is not utilized in the pipeline until after the cache memory 20 is accessed.

Figure 7:
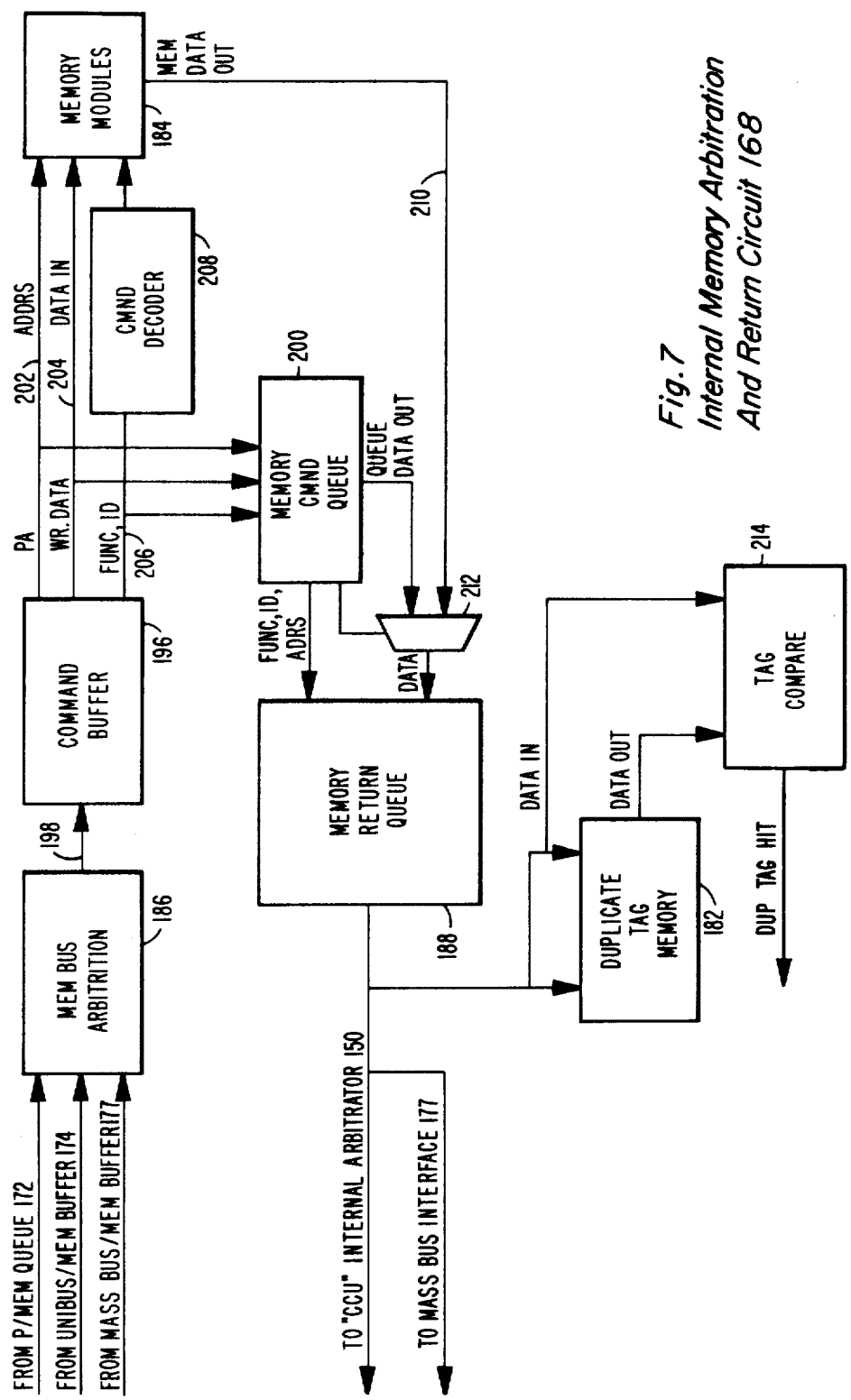
FIG. 7 depicts a diagram of the internal memory arbitration and memory return circuit of the common control unit of FIG. 6.

FIG. 7 depicts the memory arbitration and return circuit 168. As shown therein, the memory bus arbitration circuit 186 receives physical address signals, function code signals, identification signals, and data signals (if a write command) from the processor/memory queue 172, from the UNIBUS/memory buffer 174, and from a mass storage interface circuit 177. Each of the connections comprises a separate set of conductors for transferring physical address signals, function code signals, identification signals, and data signals from a selected buffer 174, queue 176, or interface circuit 177. As with FIG. 6, the drawings only reflect the paths along which these conductors extend and does not show the individual separate conductors. Selection can be performed by conventional techniques, such as rotational, assigned priority, or dependant upon number of commands in the queues.

Once a particular command is selected by the arbitration circuit 186, the physical address signals, write data (if any), function code signals, and ID signals are transferred over the conductors 198 to a command buffer 196. From the command buffer 196, these signals are conveyed to both the memory modules 184 and a memory command queue 200 over separate sets of conductors 202, 204, and 206. A command decoder 208 receives the function code signals and the ID signals and decodes the same thereby to produce the appropriate control signals for controlling memory operations in the memory modules 184. If a read command is to be executed, memory data is returned from the modules 184 via memory bus connection 210 to a multiplexer 212. If a write command is to be executed, control circuitry in the memory module 184 enters the write data at the location identified by the physical address on the physical address conductors 202, and then records the same write data in the memory command queue 200. Depending upon the function code associated with the command, multiplexer 212 is switched by the control logic in the memory command queue 200 in order for transmitting read data from the memory modules 184 or for returning write data from the memory command queue 200 thereby to place the appropriate data, together with its function code, ID, and physical address signals, in the memory return queue 188, which in the preferred embodiment, can accommodate up to 16 sets of commands.

The output of the memory return queue 188 is then conveyed to the mass storage bus interface circuitry 177, the common control internal arbitration network 150, and the duplicate tag store 182. If the function code and ID signals specify that read data is to be returned to a mass storage device, the mass storage bus interface circuit 177 accepts the read data without use of the pipeline resources and therefore does not access, nor allocate, the cache memory 20 nor any other pipeline resource. The address of data written into memory modules 184 by a mass storage device, or by any other device for that matter, is monitored by a tag compare circuit 214, and if a write "hit" occurs in the duplicate tag memory 182, the CCU 10 requests access to the pipeline resources to update its cache memory 20. Such update operations are accomplished by transferring the write command from the memory return queue 188 to the internal arbitration network 150 which grants immediate access to the resources. Cache update commands have one of the highest priorities for access to the pipeline resources.

Data read from memory module 184 that is directed back to the processors 30 or UNIBUS devices 32 will record their associated memory addresses in the duplicate tag store 182 prior to being loaded into the memory return queue 188. Accordingly, the duplicate tag store 182 contains addresses of all tag addresses of the cache memory 20 whether or not the cache tag store 20A has yet been allocated. Write data commands in the queue 188 that is scheduled to update the cache memory 20 access the duplicate tag store 182 after exiting from the queue 188. Thus, even though the cache 20 has not yet been allocated by read data scheduled to do so, a write command will not cause an update of the cache 20 if there is an allocate operation pending in the queue 188. Therefore, in accordance with another aspect of this invention, the queuing arrangement prevents false updates of a cache memory location that will be imminently allocated by read return data and read commands which are resident, but not yet executed, in the queue 188. This arrangement obviates the need to interlock commands that alter the tag store 20A of the cache memory 20. Such interlocking would seriously degrade overall performance of the system.

As previously stated, the P-Bus 76 comprises separate address and data sections for conveying respectively address and control signals on one hand, and data signals on the other hand. Correspondingly, the resource of the common control unit is divided into separate address section, depicted in FIG. 8A, and a separate data section depicted if FIG. 8B. In a command that has associated data signals is placed on the P-Bus 76 by a P-Bus device, the function code signals, ID signals, and address signals are placed in a first stage register 352 during a first P-Bus cycle, and the data signals are placed in the first stage register 306 of the data section of the common control unit four cycles later. When the next set of command information is placed in the first stage section 352, the first set of command signals advances to the second stage registers 354, and the associated data signals with the second command, if any, is placed in the register 306. The previous set of data signals advanced to the second stage data register 308. Thus, as each set of command information is placed in the register 352, its corresponding data signal follows four cycles later in the data register 306. The advantage of transferring the data signals four cycles behind the function code, address and ID signals is apparent from the brief review of the common control unit 10 depicted in FIG. 6. Assume that a miss occurred in the cache 166 thereof. An access to the memory modules is made and the corresponding data is returned through the internal arbitration network 150. The function code, ID and physical address signals emanate from the arbitration network 150 onto data conductors 155 while the corresponding data signals are carried via conductors 154 to the first stage register 152. When the function code, ID, and physical address signals reach the P-Bus 76 by way of the output registers 163, the P-Bus device which initiated the read command is notified of its upcoming data signals which will be propagated through the common control unit resources four cycles later.

Figure 8A:
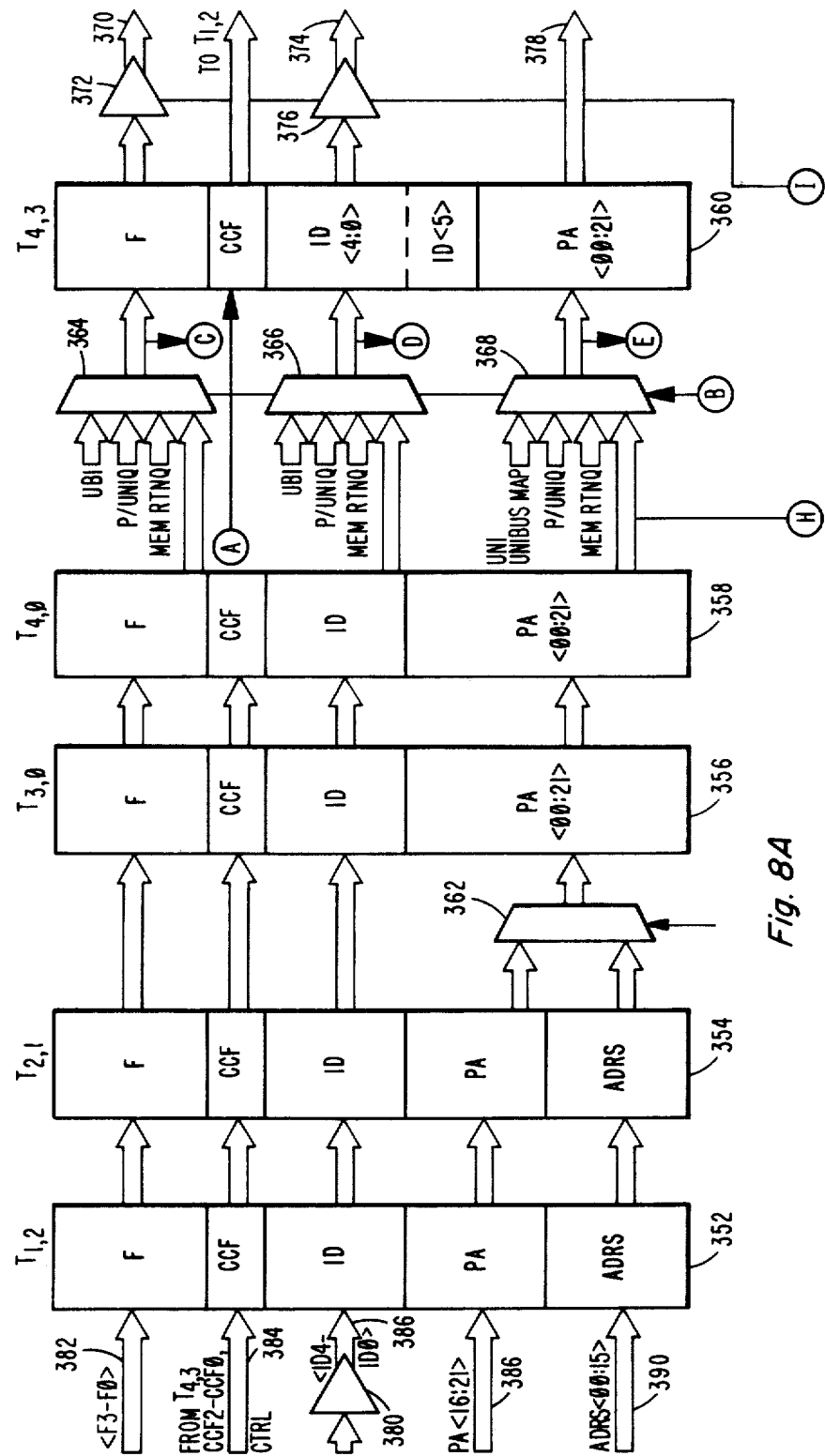
FIGS. 8A and 8B show functional elements of the shared resources in the common control unit of FIG. 1.
Figure 8B:
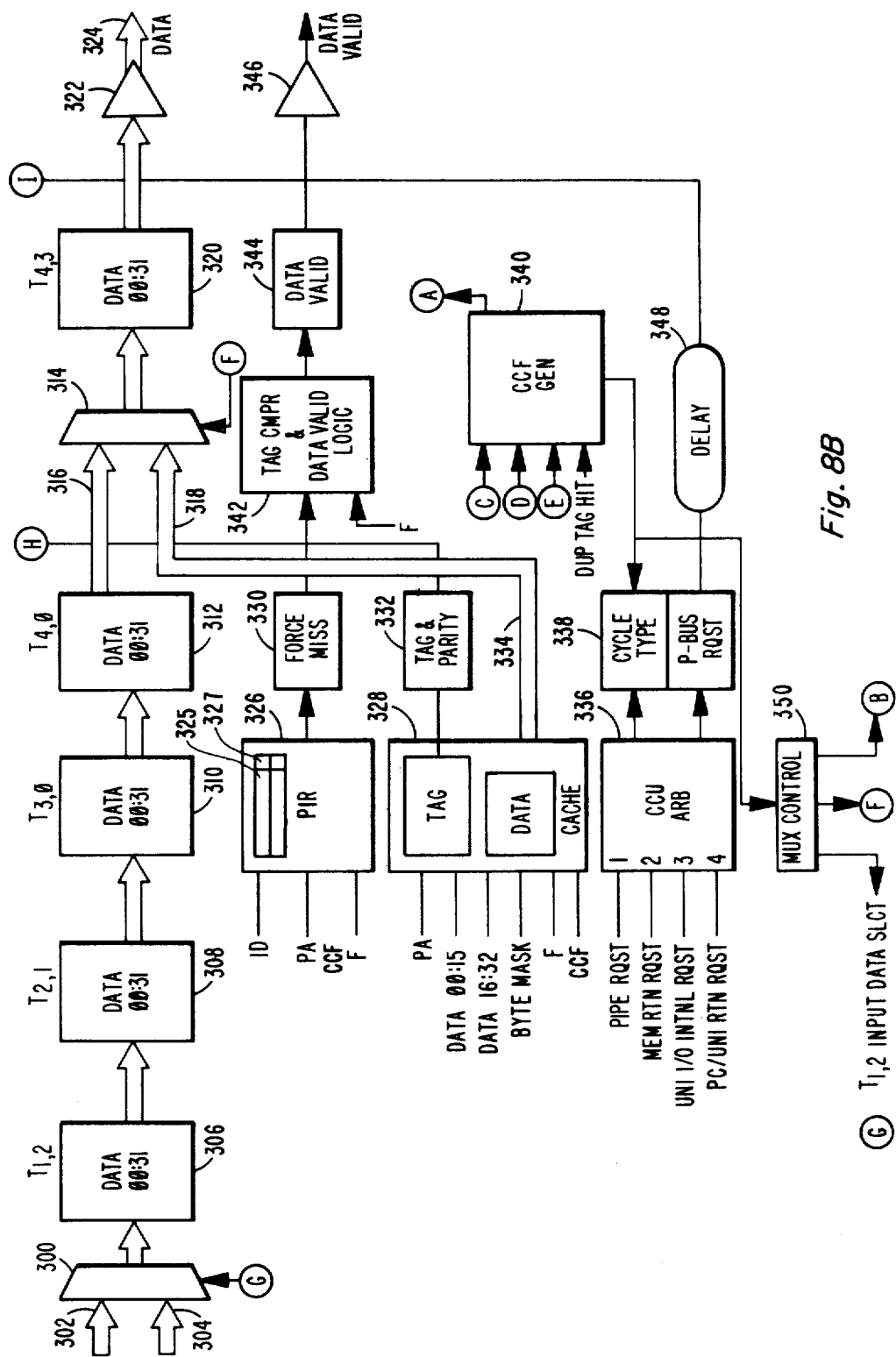

Refer now to FIGS. 8A and 8B. They show the stages of the pipeline resources through which sets of command information are passed in an ordered pipeline sequence. For clarity in describing their operation, the address translation and memory management portions of the pipeline are omitted here. The CCF generator 340 controls the operation of all the registers 306-312, 320, and 352-360, multiplexers 314, 364, 366, and 368, and internal logic of the registers of FIGS. 8A and 8B when activated by the clocking signals previously explained. The common control arbitrator 336 and the CCF generator 340 monitor the information signals associated with the commands as they are sequenced through the resources of the pipeline. On the first pass of the set of command information through the pipeline, the CCF generator 340 receives information that is to be returned to the P-Bus 76 from multiplexers 364, 366, and 368. In response to that information, the CCF generator 340 produces a set of control bits CCF2-CCF0 which are then supplied to the CCF section of the register 360. Other control signals from the CCF generator 340 are supplied to a multiplexer control circuit 350 which controls the selection of the multiplexers 364, 366, and 368 on subsequent passes of command information through the pipeline resources. Additionally, the multiplexer control circuit 350 controls the selection of cache data on conductors 318 or pipeline data transmitted over conductor 316 through the multiplexer 314. The conditions by which the selection is made was previously explained. The multiplexer control circuit 350 also controls a multiplexer 300 thereby to select data signals from the pipeline via conductors 302 or data signals from the internal arbitration circuit 150 via conductors 304.

To insure that stale data is not returned to a commanding device from the write-through cache memory 328, the common control unit 10 also includes a Processor Index RAM 326 shown in FIG. 8B. The Processor Index RAM contains an index position 325 for storing physical addresses and ID signals and a write-in-progress bit 327 for indicating whether the device identified by the ID signals therein has transmitted a write command that has not yet been written in the cache memory. When the command information of a commanding device reaches the cache memory stage of the pipeline resources, it not only checks the address tag store in the cache memory 328 to ascertain whether its requested data is resident in the cache memory, it also checks its index position 325 and its write-in-progress bit 327. Thus, even though the requested information is resident in the cache memory 328, if the write-in-progress bit 327 is set, the circuit 330 will force the commanding device to "miss" its memory reference to the cache. Accordingly, the commanding device will always retrieve fresh data from the random access memory rather than the stale data then resident in the cache memory.

The force "miss" circuit 330 alters the control logic in the tag compare and data valid logic circuit 342 thereby to negate a DATA VALID signal when the driver 346 is activated. These operations are permitted to occur by a delay line 348 which delays the transmission of the command and data information until such time as a tag compare and access to the processor index RAM 326 can be made.

To further optimize efficient use of the pipeline resources, when requested read data is scheduled to be returned through the data section of the pipeline resources, the common control arbitration network 336 allocates the return information to a P-Bus slot only if data is not being transmitted with another command in the pipeline. Such a command will have been queued in the queue 172, 174, or 176 whereby its associated function code, ID, and address signals are discarded from the control section of the pipeline shown in FIG. 8A. Thus, the associated time slot in the control section is available for other use.

If this type of time slot is available, the multiplexer control circuit 350 will cause the multiplexers 364, 366, and 368 to enter the function code signals, ID signals, and a portion of the physical address signals into the register 360, which signals are thereafter driven onto the P-Bus 76 at the same time that the requested read data is supplied to the pipeline input buffer 306. When the data that was supplied to the data register 306 reaches the output buffer 320 just prior to being driven onto the pipeline, the common control unit will have recirculated the function code signals, ID signals, and physical address signals to itself in the vacant time slot of the control section of the pipeline so that all of this information reaches the output buffers 360 and 320 at the same time so that they together may be placed on the P-Bus 76.

Other operations are also performed within the common control unit depending on the status of the CCF generator control bits CCF2-CCF0. These control bits are recirculated through the register stages 352, 354, 356, 358, and 350 and 360 thereby to initiate certain action within the processor index RAM 326 and the cache memory 328. FIG. 5 depicts operations that are performed internally within the common control unit in accordance with the type of command, the physical address range, and the function code signals F3-F0. The appropriate information is supplied from the registers to control circuitry in the common control unit to effect these operations.

The foregoing description is limited to a specific embodiment of this invention. It will be apparent, however, that this invention can be practiced with data processing systems having diverse basic construction or with systems that use different internal circuitry than is described in this specification with the attainment of some or all of the foregoing objects and advantages of this invention. Therefore, it is the object of the appended claims to cover all such variations and modifications as come within the true spirit and scope of this invention.

What we claim as new and desire to secure by Letters Patent of the United States is:

1. A data processing system that provides for the transfer of information among devices in the data processing system wherein the devices issue commands which include data signals and control information, the control information including code signals that specify the type of information transfer operation that is to be performed, device identification signals that identify the device involved in the transfer of information, and address signals that specify a location in the device to which or from which the information is to be transferred, said data processing system comprising:

A. random access memory means (28) for storing information in a plurality of addressable storage locations therein, B. common control means (10) including
 i. pipeline resource means comprising a control section (FIG. 8A) and a data section (FIG. 8B) for processing commands in an ordered pipeline sequence, said resource means comprising
  a. control input means (352) in the control section for receiving control information and data input means (306) in the data section for receiving data signals,
  b. associative memory means (20) that includes data store means (20B) having addressable storage locations for storing copies of information contained in said random access memory means, and address tag store means (20A) for storing memory addresses that specify the addressable storage locations in said random access memory means that are associated with the information contained in said data store means,
  c. tag compare means (162) for determining whether memory data requested by a command is resident in said associative memory means,
  d. queuing means (176) for receiving commands that seek to access said random access memory means, and
  e. control output means (163) in the control section for transmitting control information therefrom and data output means (163) in the data section for transmitting data signals therefrom,
  ii. memory interface means interconnecting the random access memory means and the common control means comprising
     a. command receiving means (196) for receiving commands that read or write information in said random access memory means,
     b. memory return means (65) for storing information that is read from or written into said random access memory means, and
     c. memory control means (208) connected to said command receiving means and said memory return means for controlling the transfer of information among said random access memory means (184), said command receiving means, and said memory return means (65), and
  iii. timing and control means (26) for controlling the operation of said common control means comprising
     a. pipeline timing means for sequencing commands through successive stages of said pipeline resource means and being further responsive to said tag compare means for enabling a transfer of data requested by a command from said associative memory means to said control output means when data requested by said command is resident in the associative memory means, and
     b. queuing control means (158) responsive to said tag compare means for entering a command in said queuing means (176) when data requested by said command is not resident in said associative memory means, said queuing control means being further responsive to the control information in said command for entering it in said queuing means (176) when the command seeks to write information in said random access memory means.

2. A data processing system as recited in claim 1 wherein said memory interface means includes duplicate tag store means (182) for maintaining copies of information contained in said tag store means (20A) and said timing and control means further includes:
  c. updating means (336, 340, 350) responsive to information in said duplicate tag store means (182) for updating said data store means (20B) when a command writes information in said random access memory means, and
  d. allocation means (336, 340, 350) responsive to code signals in said commands for allocating said tag store means (20A) and said data store means (20B) when information that is not resident in said associative memory means is read therefrom.

3. A data processing system as recited in claim 2 wherein said timing and control means further includes
  e. means for sequencing control information of the command in a first time phase through the control section of said resource means and for sequencing the data signals of the commands in a second time phase through the data section, and
  f. means (150) for monitoring the commands being sequenced through said resource means and for transmitting to said resource means data signals scheduled to update or allocate said associative memory means during a control information time slot that lacks associated data signals thereby to provide use of an otherwise vacant time slot in the data section.

4. A data processing system as recited in claim 3 wherein the pipeline resource means further includes:
  a(1). memory management means (22) for controlling access to certain locations in said random access memory means, and
  a(2). address translation means (24) for converting virtual addresses in the command to physical addresses in the devices of the data processing system.

5. A data processing system as recited in claim 3 further including:
  C. multiprocessing means including a plurality of independently operating processor means (30) for executing instructions, and
  D. processor bus means (76) for transferring information among said plurality of processing means and said common control means, said processor bus means including
     i. first conductor means (102) for connection with said control input means (352) and said control output means (360) thereby to transfer control information with said common control unit, and
     ii. second conductor means (104) for connection with said data input means (306) and said data output means (320) thereby to transfer data signals with said common control means.

6. A data processing system as recited in claim 5 wherein said pipeline timing means operates synchronously thereby to synchronously sequence control information through the control section (FIG. 8A) and to synchronously sequence data signals through the data section (FIG. 8A), and said timing and control means further includes:
  c. processor bus timing means synchronized with said pipeline timing means for enabling a processor means to access said processor bus means (76), said processor bus timing means being operative to couple control information signals from said processor means on said first conductor means (102) thereby to enable the control information signals to be sequenced in a first time phase through the control section (FIG. 8A), and being further operative to couple data signals from said processor means on said second conductor means (104) thereby to enable the data signals to be sequenced in a delayed second time phase through the data section (FIG. 8B).

7. A data processing system as recited in claims 1, 2 or 6 wherein said common control means includes processor index means (326) in the associative memory means having
  (a) an index field (325) associated with each processor means for storing address signals carried by a write command issued by said processor means, and
  (b) write-in-progress indication means (327) for indicating whether said processor means seeks to write data in the random access memory means at the location specified in said index field, and
said tag compare means includes means responsive to said write-in-progress indication means for inhibiting a subsequent command from accessing the information in said data store means (20B) associated with a location in said memory means for which there is a write-in-progress, and said timing and control means further includes means for clearing said write-in-progress indication means when the write data in the data store means (20B) has been updated.

8. A data processing system as recited in claim 7 wherein each processor means includes write-in-progess flag means (79, 81, 83, 85) which when set inhibits said respective processor means from issuing a subsequent write command until its previously issued write command has updated said associative memory means.

9. A data processing system as recited in claim 7 further including
E. input/output means for providing external communication with said data processing system comprising:
   i. input/output interface means (64, 72) connected to said processor bus means (76) for externally transferring information signals with said common control means,
   ii. at least one input/output device (32), and
   iii. input/output bus means (60) interconnecting said input and output interface means and said input and output devices for asynchronously transferring information signal therebetween.

10. A data processing system as recited in claim 9 wherein said input/output interface means includes:
   i. input/output command transmitting means (172) connected to said asynchronous bus means (60) for transmitting control information and data signals from said common control means (10),
   ii. input/output command receiving means (178) connected to said asynchronous bus means (60) for receiving control information and data signals from said input/output devices, and
said timing and control means including means for controlling said command transmitting means (172) and said command receiving means (178) so that the operation of said common control means for the transfer of information is compatible with the operation of said asynchronous bus means (60) for the transfer of information.

11. A data processing system as recited in claim 9 further including:
F. secondary storage means for storing information comprising:
   i. at least one secondary storage device (68) for storing information therein,
   ii. controller means (40) connected to said secondary storage devices for controlling the transfer of information to and from said secondary storage devices, and
   iii. mass storage bus means (46) for connection with said secondary storage controller means for transferring information signals thereover, and
   iv. mass bus interface means (177) connected to said memory return means (188) and to said command receiving means (186, 196) for transferring information between said random access memory means and said secondary storage devices over said mass storage bus means (46).

12. A data processing system as recited in claim 11 wherein said memory interface means further includes memory arbitration means (186) for determining which command will access said random access memory means.

13. A data processing system as recited in claim 12 wherein said common control means further includes:
   iv. common control arbitration means (150) for receiving a plurality of commands, said arbitration means being operative to enable one of said commands to access the resources of said pipeline resources means, said arbitration means being operative to provide priority to commands from said memory return means that seek to update or allocate the associative memory means (20).

* * * * *

UNITED STATES PATENT AND TRADEMARK OFFICE
CERTIFICATE OF CORRECTION

PATENT NO. : 4,392,200

DATED : July 5, 1983

INVENTOR(S) : Jega A. Arulpragasam et al.

It is certified that error appears in the above-identified patent and that said Letters Patent is hereby corrected as shown below:

Column 15, line 2, replace "158" with --159--.

Column 15, lines 13-15, replace "If it is not . . . write. If it is, then" with --Then--.

Column 15, line 19, after "memory", insert --if the duplicate tag store indicated that the memory location just written is one that is contained in cache 20. Otherwise, the cache 20 is not updated during the second pass--.

Column 15, line 20, replace "86" with --182--.

Replace the originally issued FIG. 6 with the attached FIG. 6.

Signed and Sealed this

Twenty-eighth Day of April, 1987

*Attest:*

DONALD J. QUIGG

*Attesting Officer*  *Commissioner of Patents and Trademarks*